US008903725B2

(12) United States Patent
Pilz

(10) Patent No.: US 8,903,725 B2
(45) Date of Patent: Dec. 2, 2014

(54) METHOD AND ARRANGEMENT FOR CONTROLLING USER ACCESS

(75) Inventor: Christian Pilz, Munich (DE)

(73) Assignee: Voice.Trust AG, München (DE)

( * ) Notice: Subject to any disclaimer, the term of this patent is extended or adjusted under 35 U.S.C. 154(b) by 862 days.

(21) Appl. No.: 12/625,913

(22) Filed: Nov. 25, 2009

(65) Prior Publication Data

US 2010/0131279 A1    May 27, 2010

(30) Foreign Application Priority Data

Nov. 26, 2008 (DE) .......................... 102008058883

(51) Int. Cl.
*G10L 21/00* (2013.01)

(52) U.S. Cl.
USPC ............ 704/273; 704/246; 704/239; 704/238

(58) Field of Classification Search
USPC ......... 704/231, 235, 273, 243, 244, 251, 255, 704/257, 236–240, 246–250, 270; 713/182; 379/88.02
See application file for complete search history.

(56) References Cited

U.S. PATENT DOCUMENTS

| | | | | |
|---|---|---|---|---|
| 5,517,558 A | * | 5/1996 | Schalk ........................ | 379/88.02 |
| 6,308,153 B1 | * | 10/2001 | Huang et al. .................. | 704/246 |
| 6,356,868 B1 | * | 3/2002 | Yuschik et al. ............... | 704/246 |
| 6,496,800 B1 | * | 12/2002 | Kong et al. ................... | 704/239 |
| 7,222,072 B2 | * | 5/2007 | Chang .......................... | 704/250 |
| 7,386,448 B1 | * | 6/2008 | Poss et al. ..................... | 704/247 |
| 7,536,304 B2 | * | 5/2009 | Di Mambro et al. ......... | 704/273 |
| 8,190,437 B2 | * | 5/2012 | Farrell et al. ................. | 704/273 |
| 2006/0294390 A1 | * | 12/2006 | Navratil et al. ............... | 713/182 |

FOREIGN PATENT DOCUMENTS

| | | |
|---|---|---|
| DE | 102007014885 | 10/2008 |
| DE | 102007033812 | 1/2009 |

* cited by examiner

*Primary Examiner* — Huyen X. Vo
(74) *Attorney, Agent, or Firm* — Volpe and Koenig, P.C.

(57) ABSTRACT

Method for controlling user access to a service available in a data network and/or to information stored in a user database, in order to protect stored user data from unauthorized access, such that the method comprises the following: input of a user's speech sample to a user data terminal, processing of the user's speech sample in order to obtain a prepared speech sample as well as a current voice profile of the user, comparison of the current voice profile with an initial voice profile stored in an authorization database, and output of an access-control signal to either permit or refuse access, taking into account the result of the comparison step, such that the comparison step includes a quantitative similarity evaluation of the current and the stored voice profiles as well as a threshold-value discrimination of a similarity measure thereby derived, and an access-control signal that initiates permission of access is generated only if a prespecified similarity measure is not exceeded.

13 Claims, 4 Drawing Sheets

METHOD AND ARRANGEMENT FOR CONTROLLING USER ACCESS

CROSS REFERENCE TO RELATED APPLICATIONS

This application claims the benefits of German Application No. DE 10 2008 058 883.0, filed Nov. 26, 2008, which is incorporated herein by reference as if fully set forth.

BACKGROUND

The invention relates to a method as well as an arrangement for controlling a user's access to a service made available in a data network, or to information stored in a user database in the general sense, which in particular should also be understood as data stored in prepaid and/or credit-card systems.

In conventional access-control systems such as are employed in data networks, identification and/or authentication means of the knowledge-based type are employed in order to fulfill the security demands. In particular, for decades password-based or PIN-based identification/authentication sequences have been known and in general use. Where sensitivity to spying or misuse is involved, for example in home-banking applications, additional specialized security measures such as the provision and obligatory employment of individual transaction codes, or TANs, are also known and widely used. Such supplementary security-enhancing sequences are knowledge-based and hence entail the typical disadvantages of all knowledge-based systems, i.e. on one hand problems associated with the loss of relevant information by the authorized user, and on the other hand risks arising when an unauthorized user gains access to such information.

Therefore in recent years considerable effort has been made to incorporate other types of identification/authentication sequences into the security mechanisms of data networks. Particularly common approaches are to add "possession-based" mechanisms (tokens) and/or "being-based" (biometry-based) mechanisms to the familiar knowledge-based mechanisms. For example, the biometric authentication sequences used in automated teller machines, which are based on fingerprint or retina recognition, have been proposed for controlling access to bank accounts. Furthermore, the fingerprint-based access-control devices which are now commonly used by notebooks and other PCs have been mentioned as a special way to control access to data networks.

Recently voice-based authentication solutions have already been introduced by some firms as a special type of biometry-based identification/authentication, as a supplement to their internal knowledge-based access-control mechanisms.

In the case of internet- and mobile-phone-based services and activities, in particular on internet marketplaces such as Ebay or in financial transaction systems on the internet such as PayPal, as the number of users worldwide rapidly rises, the number of fraudulent attacks is also increasing significantly. The probability of a successful invasion of accounts within a worldwide internet-based service with millions of users is much higher than that of phishing attacks on local banks.

Meanwhile, system providers such as PayPal and Ebay have responded to the growing number of attacks, in that they have introduced a hardware token as second level of security for user accounts. Recently developed solutions of this kind are based on the idea that an individual security code which is generated periodically can protect the user from fraudulent misuse of a personal account.

These recently developed mechanisms unfortunately present additional costs that must be borne by the provider and/or the user, and also suffer from the typical disadvantages of possession-based identification/authentication means.

The applicant's patent DE 10 2007 014 885 A1 is concerned with making available an improved means of controlling access to data networks that is relatively easy to implement and also attractive regarding expense; the applicant has also added to the patent other improved access-control procedures in various usage contexts.

Authentication and access-control systems based on the special characteristics of the human voice and speech encounter the fundamental problem that they can be defrauded to a certain extent by previously prepared recordings of speech samples. So-called challenge-response procedures counteract this in an authentication situation by stochastically selecting previously specified speech samples from a reservoir: during each authentication procedure, the number and sequence of the speech samples to be currently input are determined for the first time during this actual authentication. In practice, this makes it considerably more difficult to defraud the access-control system, but fraudulence cannot be excluded insofar as the defrauder has available a recording of the entire "pool" of speech samples used for training in an initialization phase, and succeeds in responding rapidly enough to the requests made by the user guidance system. Here it should be noted that in practice, for reasons of user acceptance, the reservoir or "pool" of speech samples used during initialization or training is quite small.

Therefore in the context of voice-profile-based access-control systems, as well, it has recently been considered useful to employ not only current speech samples but also supplementary authentication means to obtain a "secure" authentication of a user who is requesting access (the applicant's unpublished German patent application No. 10 2007 033 812.2). However, users tend to find these additional authentication means annoying, which could impair the basically high degree of user acceptance of these systems.

SUMMARY

The objective of the present invention is thus to disclose an improved method and a corresponding arrangement of the kind described above, which without additional authentication means enable a very high degree of recognition security and hence to the greatest possible extent can prevent unauthorised persons from obtaining access to services or data.

This objective is achieved in its methodological aspect by a method with the characteristics of the invention, and with respect to the apparatus by an arrangement with the characteristics of the invention. Advantageous further developments of the concept central to the invention are described below.

The invention is based on the substantial idea that temporal variations are a natural feature of the human voice, so that no one can repeat a vocalization in a completely identical manner. The result, in the context of the access-control system concerned here, is that a currently input speech sample, if it is in fact spoken at that time and not produced by playing a recorded sample, cannot be completely identical to a speech sample that had been input previously and stored in the system, nor can the voice profiles calculated from these particular speech samples be completely identical to one another. Because there is also no identity, of course, between the speech samples provided by two different persons, and hence the systems serve the evident purpose of excluding "strangers" (i.e. people not identical to the authorized user) from system access, the non-identity in itself alone is not a useful criterion for access control.

However, while the central idea underlying previous systems was that a predetermined measure of similarity between a currently obtained voice profile and a stored voice profile must be reached during an authentication procedure, this concept is now supplemented by the idea of introducing an additional (higher) threshold value of similarity between the vocalizations, which must not be exceeded if access is to be granted. Technically this concept is implemented by calculation of a measure of similarity between voice profiles and/or speech samples that are to be compared with one another, and a subsequent threshold-value discrimination with reference to an upper threshold value.

It should be noted that naturally a technical representation and reproduction of speech likewise leads to certain changes (so-called channel variations and channel noises), which likewise results in a non-identity between a currently input and a stored (physiologically identical) speech sample. Such technical discrepancies, however, have characteristics different from the natural variation of speech, and hence can quite reliably be distinguished from the latter on the basis of a sufficiently large measured databank. In the context of the proposed method, the discrimination functions largely by suitable selection of the algorithm for determining the degree of similarity; in addition, a suitable (preferably dynamic) specification of the threshold level can contribute substantially to this process.

With the proposed method, a mechanism is made available that detects attempts to defraud a speech- and/or voice-based authentication system by means of stored speech samples, and provides a defense against them. It should be emphasized that the system security can thereby be substantially increased without requiring the greater initialization and/or training effort that experience has shown to impair user acceptance. Furthermore, the security associated with defense against attempted fraud (including that by means of synthesized speech) is higher than is achieved by the abovementioned challenge-response method, which furthermore decreases user acceptance. The proposed method in particular further increases the usability of speech-based access-control systems for sensitive applications (content management, brokerage, sensitive databases . . . ), and the readily understandable concept contributes to a high degree of acceptance by potential system operators.

To achieve sensible system operation with high user acceptance, it is advantageous for the upper threshold value of the measure of similarity to be determined dynamically on the basis of several stored voice profiles of one and/or many users and/or several currently input speech samples. As the system is further developed, and the number of accesses by a particular user increases, the security level becomes progressively higher, but even while the size of the system remains small and in particular for the first few accesses of an individual user, it is possible to preserve a sensible form of system operation, one that does not demand a too-extensive enrollment from the user.

In this sense it can be provided that both the initial voice profile and also every subsequent one obtained during a user's attempt to gain access is stored. In particular, either continuously or during a current access attempt, the stored voice profiles can be used to determine a current upper threshold value of the similarity measure. Furthermore, the current voice profile can also be compared with more than one of the stored voice profiles, from the results of these comparisons a mean current similarity measure can be determined, and to this mean current similarity measure the threshold discrimination can be applied.

In another embodiment it is provided that as a measure of similarity a value representing the distance between the current and a stored voice profile is calculated, which in particular can include a likelihood consideration. The distance calculation is carried out in the sense of the Bayes decision theorem for the 2-class problem, and the measure of distance can be understood in the sense of the Kullback-Leibler distance. Distance measurements in this sense and likelihood considerations can be combined, in particular in the sense that the decision as to whether a user who is seeking access does have the claimed identity is made by carrying out a measurement of the distance between the two speaker models, whereas the test for the potential presence of a stored speech sample is carried out on the basis of a likelihood consideration. Other ways of performing these tests, including those with two qualitatively differing distance measurements or two qualitatively differing likelihood considerations, are also possible for solving the first and second partial verification tasks.

Another embodiment of the invention provides that the speaker is required to input the same current speech sample several times in succession, and each of the speech samples then provided is subjected to a first similarity evaluation and thereafter, in particular in dependence on a result of the first similarity evaluation, at least one of the current speech samples is used to calculate the current voice profile and this, with inclusion of a second similarity evaluation, is compared with the stored voice profile or one of them. Therefore, depending on the concrete organization of the system, two procedures are possible: it can be determined in a first step whether the alleged user can be considered an authorized person with adequate security, after which a second testing step is carried out to exclude an attempt at fraud by means of a recording, or else the same things are done in reversed order.

As an alternative to this last procedure, which still imposes some discomfort on the user, the method can be designed so that during the initialization and subsequent attempts to gain access, speech samples provided by the user are stored and the speech sample currently being input is initially tested by a group of first similarity evaluations, and either thereafter or previously the voice profile found from the currently input speech sample is tested by a second similarity evaluation with the stored voice profile or one of them.

The security of the method can be further increased if a user guidance sequence is emitted, which requires the user to input a first speech sample encountered in previous training, as well as a second speech sample for which there was no previous training, and the first and second speech samples are tested by a combined similarity evaluation. In particular, it is hereby provided that the combined similarity evaluation comprises calculation of a first current voice profile from the second speech sample, a first and second similarity evaluation with reference to a stored voice profile to obtain a first and second measure of similarity, and a step in which the first and second similarity measures are compared with one another. Because of the additional imponderability intrinsic to this implementation of the method, for practical purposes the possibility that a user will defraud the system by using a recording can be absolutely ruled out.

Aspects regarding the apparatus involved in the proposed solution will be readily evident to a person skilled in the art from the methodological aspects discussed above, so that there is no need for another detailed description here.

BRIEF DESCRIPTION OF THE DRAWINGS

Advantages and useful features of the invention will furthermore be evident from the following explanations of preferred embodiments with reference to the figures, which show the following.

DETAILED DESCRIPTION OF THE PREFERRED EMBODIMENTS

Figure 1:
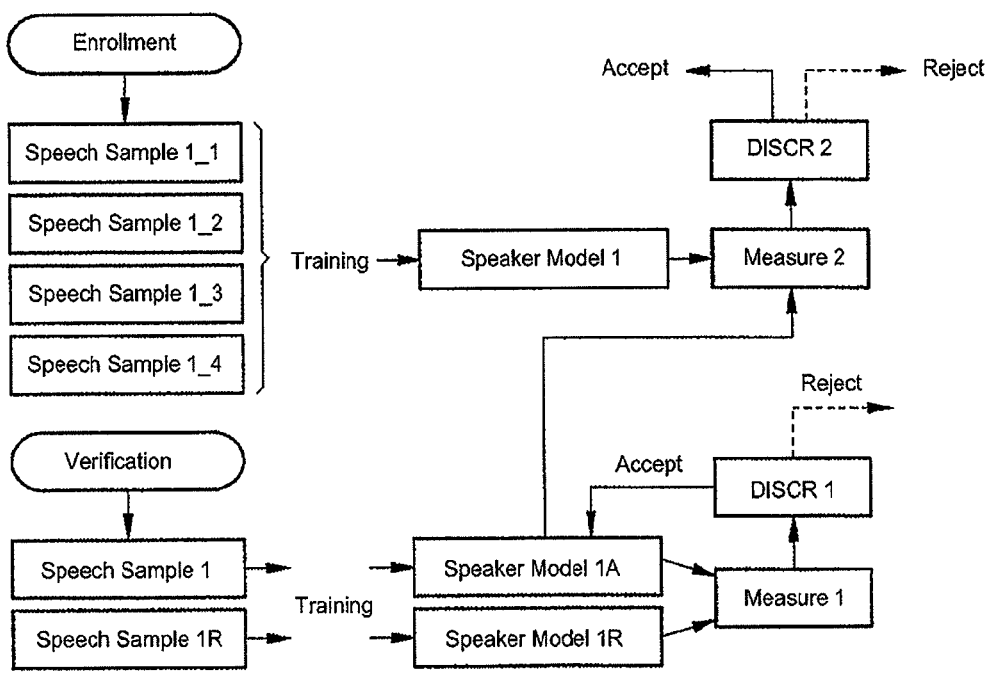
FIG. 1 A first exemplary implementation of the method as a flow diagram.

As shown in FIG. 1, in an initialization phase, termed "enrollment" in such systems, during "training" a User 1 produces several (in this case four) vocalizations, termed Speech Samples 1_1 to 1_4, which are used to calculate a voice profile specific to that user, here termed Speaker Model 1. When the system is employed, i.e. when User 1 wants access to a service or to data protected by the system, his identity with the authorized user is verified with reference to the stored voice profile Speaker Model 1; in other words, the user is authenticated.

For this purpose he is instructed to input a Speech Sample 1, for instance to speak into the system a password assigned to him, and from this currently acquired speech sample, again in a training process, a current voice profile Speaker Model 1A is produced. Immediately thereafter the alleged user is instructed to input the same speech sample again, and this new sample is available as Speech Sample 1R. From this another current or temporary voice-profile Speaker Model 1R is produced, and from the two current voice profiles Speaker Model 1A and Speaker Model 1R a current first similarity measure Measure 1 is obtained and subjected to a threshold-value discrimination DISCR1, with a predetermined upper threshold value. If this value is exceeded, the input speech samples are judged to have been fraudulently produced, and the attempted access is rejected. If the upper threshold value is not exceeded, the input of the speech samples is accepted and one of the current voice profiles (in the figure, the profile Speaker Model 1A) is made available for comparison with the previously stored voice profile Speaker Model 1.

From these two voice profiles a second similarity measure Measure 2 is calculated, and this too undergoes a threshold-value discrimination DISCR 2, this time with respect to a predetermined lower threshold value, which has been calculated with reference to appropriate databases; the result, based on the available system data, should be above this lower value if the speaker who is requesting access is to be considered identical to the authorized Speaker 1. If it is below this threshold, a control signal refusing access is emitted, but otherwise a control signal permitting access is produced and emitted.

Figure 2:
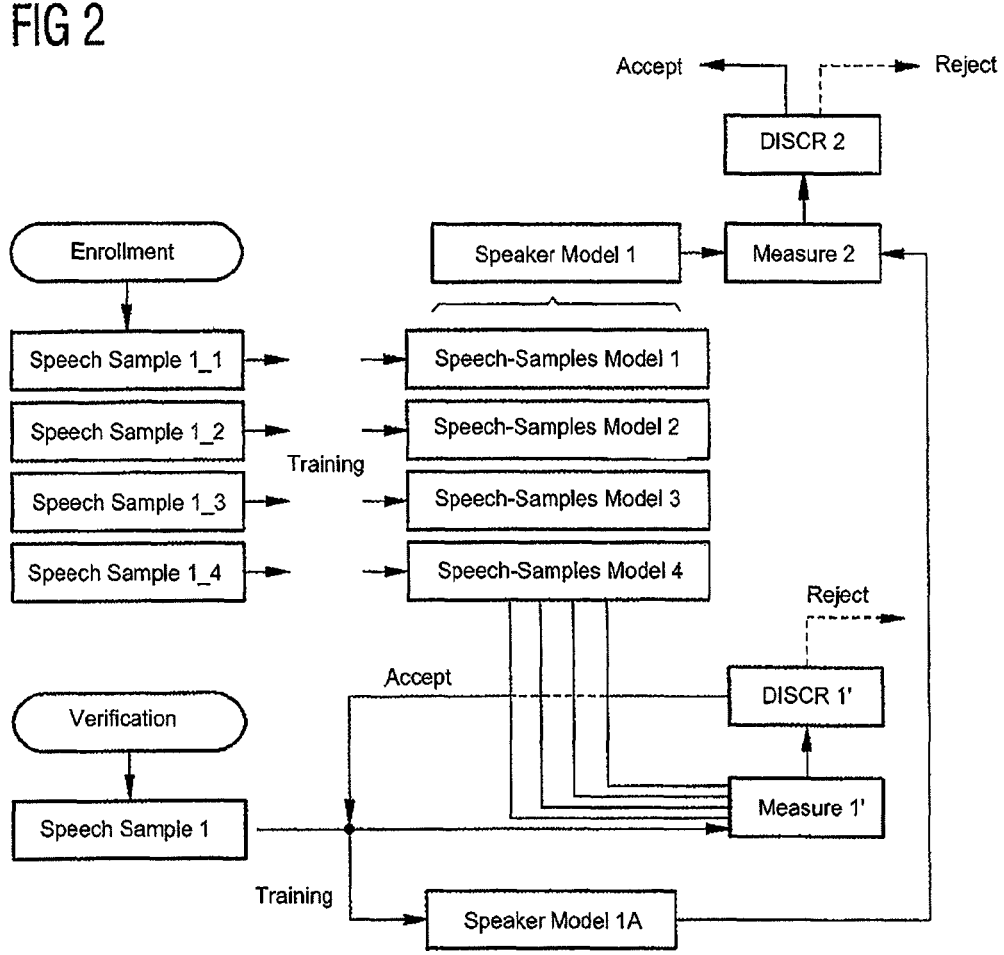
FIG. 2 A second exemplary implementation of the method as a flow diagram.

FIG. 2 shows an alternative way to carry out the procedure, which is possible when for each vocalization (speech sample) produced in the enrollment phase a preliminary evaluation result, Speech-Samples Model 1 to Speech-Samples Model 4, is deposited. Hence it becomes possible during a verification phase to eliminate the repeated speaking of one and the same speech sample; instead, a single Speech Sample 1 can be used for further processing.

This is compared with the Speech-Samples Models 1 to 4 in a group of initial similarity calculations, from which in a summarizing evaluation a mean similarity measure Measure 1' is obtained. If the associated threshold-value discrimination DISCR 1' with respect to an upper threshold value shows that the agreement is not excessively great, the current Speech Sample 1 is used to calculate the current voice profile Speaker Model 1A, and a second similarity consideration is initiated in comparison to the stored voice profile Speaker Model 1. To the resulting similarity measure Measure 2 then, as in the embodiment according to FIG. 1, a threshold-value discrimination DISCR 2 is applied with reference to a prespecified lower threshold value, and the desired access is permitted when Measure 2 is larger than the lower threshold value.

In view of the substantial qualitative differences between a single speech sample and a voice profile or speaker model calculated from a plurality of speech samples, it is evident that the first and second similarity calculations are likewise qualitatively different, and the threshold values employed for the first and second threshold-value discrimination are also derived from qualitatively different data collections.

In the practical application it can be recommended that the sequence of the above-mentioned similarity calculations and threshold-value discriminations be reversed; that is, it would first be determined whether a lower similarity threshold is reached at all, so that the alleged identity between the user requesting access and an authorized speaker can be accepted, and only then would the additional test be performed as to whether this result might have been brought about by an attempt to defraud by means of a speech recording or speech synthesizer. However, this reversal does not fundamentally alter the systematics of the proposed method.

Figure 3:
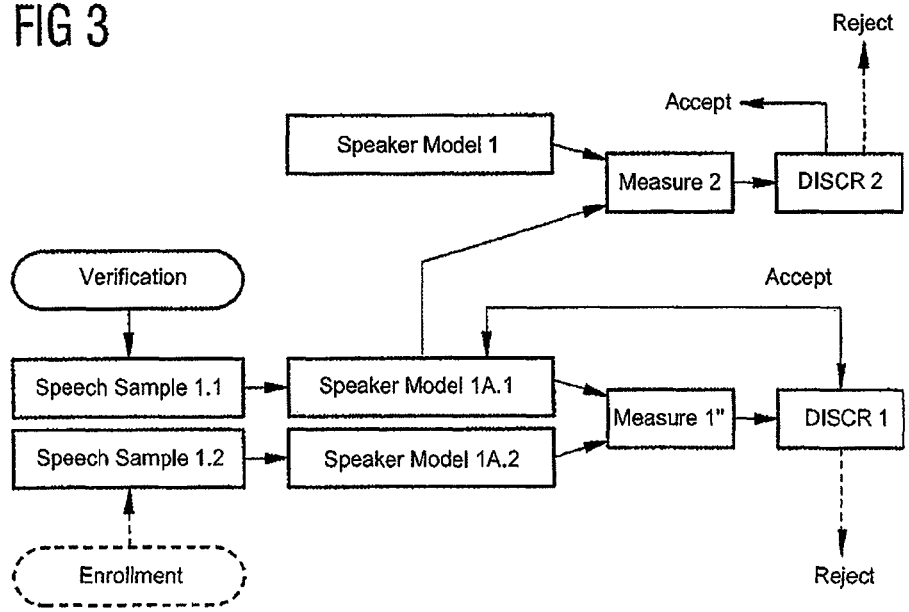
FIG. 3 A third exemplary implementation of the method as a flow diagram.

So that even more refined attempts to defraud can be counteracted, the modification of the method sketched in FIG. 3 can be put into practice. The enrollment phase is no longer shown in this figure, but only the voice profile Speaker Model 1 obtained as its result.

By means of a suitable user guidance procedure the user desiring access is required during the verification phase to input two different speech samples, Speech Sample 1.1 and Speech Sample 1.2, one of which is based on a vocalization model used during the enrollment phase, whereas this is not the case for the other one. Preferably an input is requested of such a kind that it would be difficult to incorporate into a previously prepared speech recording.

From each of the two speech samples a current voice profile Speaker Model 1A.1 or Speaker Model 1A2, respectively, is derived. A similarity measure Measure 1" between these two currently derived voice profiles is calculated and subjected to a threshold-value discrimination DISCR 1 with respect to a prespecified upper threshold value. If the threshold value is not reached, the speech samples are regarded as having been input "live" and the procedure according to the method is continued. Otherwise it is interrupted and the user is already denied access at this stage.

In case the procedure is continued, the voice profile Speaker Model 1A.1 is compared with the voice profile Speaker Model 1 obtained during enrollment, and a similarity measure Measure 2 is calculated. Then, as in the previously described embodiments of the method, the threshold-value discrimination DISCR 2 regarding a lower threshold value is applied, and if the result is above this value the identity between the alleged user and the authorized user is corroborated and a control signal granting access is emitted, whereas if Measure 2 falls below this threshold value, the conclusion is non-identity and a control signal refusing access is generated.

The implementations of the method described above can also be combined with one another in various ways, and in such a combination can also undergo certain simplifications. For instance, it is conceivable to combine the threshold-value discriminations described above as sequential in such a way that a kind of "bandpass discrimination" is produced, if they are related to the same kind of similarity measure (i.e. either each involves speech samples or each involves voice profiles). It is also possible to combine the procedures in this method with a text recognition, for example to reject an unqualified user merely on the grounds that he does not know a required password and instead provides a speech input, the content of which is incorrect.

Figure 4:
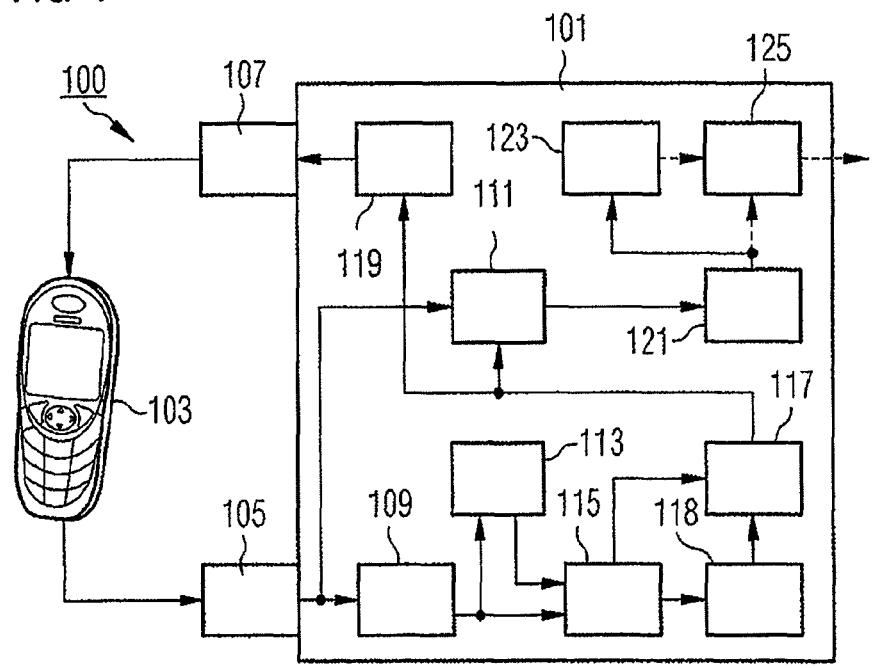
FIG. 4 A schematic representation of an embodiment of the arrangement in accordance with the invention, shown as a block circuit diagram, and FIGS. 5 to 7 Schematic representations of various developments of the arrangement in accordance with the invention.

FIG. 4 shows schematically an arrangement 100 for voice-profile-based authentication of a person, in which a section of a system server 101 substantially involved in implementing the invention is connected so as to be in communication with a mobile telephone 103 belonging to a user. It should be noted that the system server 101, in addition to the components and functions illustrated in FIG. 4, contains or carries out other, application-specific components and functions that are involved in implementing the present invention; cf. FIGS. 5 to 7.

The system server 101 is temporarily connected to the mobile phone 103 on the input side by way of a speech-sample input interface 105, and on the output side by way of a user-guidance output interface 107, enabling the user to be guided through an enrollment or verification procedure and to input at least one speech sample into the system. In addition other in/output interfaces, e.g. for entering data into the system by actuating the mobile-phone keyboard, can be provided. However, such additions need not be considered in the context of explaining the invention and are therefore not shown and described here.

The speech-sample input interface 105 is connected internally to a speech-recognition unit 109, and in parallel to a speech-sample supply controller 111, in each case to the input thereof. The speech-recognition unit 109 on its output side is connected both to a weighting-factor storage unit 113 and to the input of an evaluation-coefficient calculation unit 115. By way of an additional input the evaluation-coefficient calculation unit 115 is connected to the weighting-factor storage unit 113, so as to receive from the latter previously stored phoneme-weighting factors for those phonemes that the speech recognition process or phonematic analysis of the received speech sample has shown to be components thereof.

On the output side the evaluation-coefficient calculation unit is connected to an evaluation-coefficient threshold-value discriminator (first threshold-value discriminator) 117, the threshold value of which can be adjusted by way of a threshold-value setting unit 118. The first threshold-value discriminator 117 is connected on its output side both to a control input of the speech-sample guidance controller 111 and also to a user-guidance unit 119, so that depending on the result of the threshold-value discrimination of the phonematic evaluation coefficients in the calculation unit 115, on one hand the received speech sample is either sent on for a voice-profile analysis or blocked, and on the other hand the output of a corresponding user guidance instruction (request for an additional speech sample) is initiated.

If a new speech sample is required, in response to receipt of the control signal the user-guidance unit 119 emits the corresponding signal to the interface 107, by way of which it passes into the mobile phone 103. The described procedure is then repeated. In contrast, if the received and evaluated speech sample is usable for a voice analysis (voice-profile calculation) from the viewpoint of its phonematic evaluation, it is sent to a voice-profile calculation unit 121 and used to derive a voice profile of the user of the mobile phone 103. The signal connection represented in the figure illustrates that this—as is required for an initial enrollment of the user—is deposited in a voice-profile storage unit 123. The dotted signal lines indicate that the voice profile in case of a later verification of the user is also sent to a voice-profile comparator unit 125, in which it is compared with an initial voice profile stored in the storage unit 123, so that an output signal representing the result of the comparison can be sent from the comparator unit 125 to following stages of the system server 101.

For the actual phonematic evaluation various algorithms can be used. These are based on the results of empirical studies regarding "recognition performance", from which can be derived specific weightings for the sound components (phonemes) of speech samples that must be obtained in the context of speech recognition. In addition to the recognition-related quality of the individual phonemes, their quantity (number) can also be incorporated into the overall evaluation of a speech sample, and this is also advantageously practiced when the speech samples are of different lengths and certain features of processing technology are required.

Figure 5:
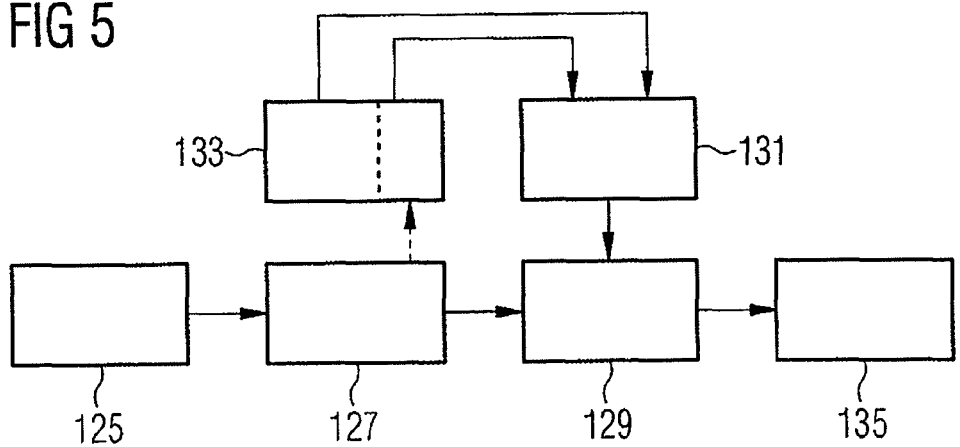

FIG. 5 gives a closer view of an embodiment of the invention in which the output of the voice-profile comparator unit 125 is connected to a similarity-measure calculation unit 127, which on the basis of a prespecified algorithm calculates a similarity measure between a stored voice profile of an authorized user and a voice profile of the (allegedly) same user that has been derived from a newly input speech sample. The similarity-measure calculation unit 127 is followed by a threshold-value discriminator 129, which also receives a dynamically adjustable threshold value from a threshold-value adjustment stage 131.

That adjustment stage is connected on its input side to a similarity-measure storage unit 133 in which are deposited, for both the current user and other users of the system, data from earlier similarity-measure calculations, which can be employed for calculation of a current value of the dynamically adjusted threshold value in the adjustment stage 131. It should be pointed out that this procedure is related to an upper threshold value, which may not be exceeded by the threshold value calculated in the similarity-measure calculation unit 127 without causing the outcome of the ongoing verification process to be classified as suspected fraud. The result of the threshold-value discrimination in the threshold-value discriminator 129 is that a signal is sent to an access-control unit 135 that initiates either permission or blockage of user access to the protected system.

Figure 6:
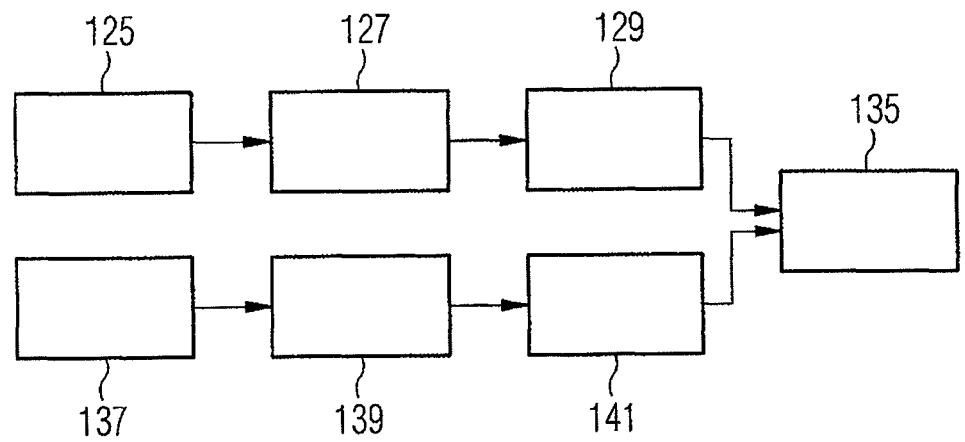

FIG. 6 shows a further development of the system designed to enable a voice-profile comparison with subsequent threshold-value discrimination (in the components 125 to 135) to be accompanied by an evaluation of the similarity between different speech samples from a verification procedure or between speech samples derived on one hand from an enrollment and on the other hand from a verification access. The latter part of the method is accomplished by a speech-sample comparator unit 137, followed by another similarity-measure calculation unit 139, which in turn is followed by another threshold-value discriminator 141 for the calculation and threshold-value discrimination of a similarity measure between speech samples.

On the output side the additional threshold-value discriminator 141 in the arrangement shown here is likewise connected to an input of the access-control unit 135—the inclusion of this unit, however, can also be modified so that the output signal of one of the two threshold-value discriminators 129, 141 is sent to the comparator unit or the similarity-measure calculation unit of the other calculation branch in each case, so that a continued calculation can be initiated only if the result of a first threshold-value discrimination does not from the outset demand rejection of the access attempt; cf. the above description with reference to FIGS. 1 to 3.

Figure 7:
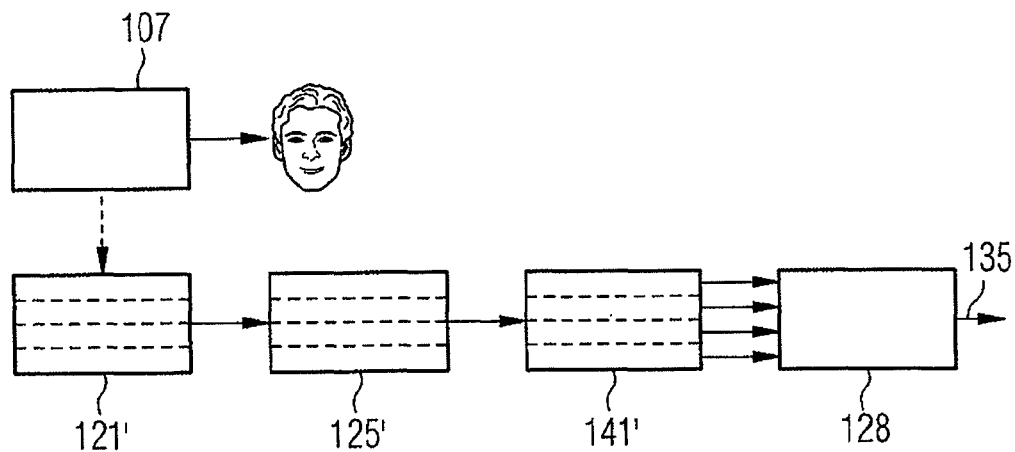

FIG. 7 shows another modification of the arrangement in accordance with the invention, in which the user-guidance output interface 107 is designed so that it sends to the user input instructions requiring several speech samples to be provided, and at the same time initiates a multi-channel processing in an appropriately modified voice-profile calculation unit 121' and voice-profile comparator unit 125'. The multi-channel voice-profile comparator unit 125 is connected to a similarity-measure calculator unit 127' with a corresponding multi-channel construction, and its outputs are connected to a similarity-measure comparator unit 128 in which several of the similarity measures calculated in the individual channels are compared with one another. On the output side the similarity-measure comparator unit 128 is then again connected to the access-control unit 135 (cf. FIGS. 5 and 6) which, as a result of the comparison of the various similarity measures that have been processed in parallel, initiates the permission or blocking of access of the (positively or negatively) verified users to the protected system.

The embodiment of the invention is not limited to the examples and emphasized aspects explained above, but is likewise possible in a plurality of modifications that are within the scope of a person skilled in the art.

The invention claimed is:

1. Method for controlling user access to a service made available in a data network and/or to information stored in a user database, in order to protect stored user data from unauthorized access, the method comprises:
inputting a speech sample of a user to a user data terminal, processing the user's speech sample in order to obtain a prepared speech sample as well as a current voice profile of the user,
and outputting an access-control signal to permit or refuse access, taking into account the result of the comparison step, wherein the comparison step includes: comparing an input speech sample with a speech sample model to determine a first similarity measure, and comparing the first similarity measure with an upper threshold value, wherein access is denied if the upper threshold value is exceeded; and if the upper threshold value is not exceeded, comparing, using a voice-profile comparator unit, the current voice profile with an initial voice profile that has been stored in an authorization database to obtain a second similarity measure, and then comparing the second similarity measure with a lower threshold value, and an access control signal that initiates permission of access is generated only if the second similarity measure exceeds the lower threshold value.

2. Method according to claim 1, wherein the upper threshold value of the similarity measure is determined dynamically on the basis of several stored voice profiles of at least one of a user, many users or several currently input speech samples.

3. Method according to claim 1, wherein the speaker is required to provide multiple, identical current speech samples, and each of the speech samples so provided is used for the first similarity measure and thereafter or previously at least one of the current speech samples is used to calculate the current voice profile and the latter, with inclusion of the second similarity measure, is compared with the stored stimulus profile or one of them, wherein a result of the comparison of the first similarity measure determines whether the comparison with the second similarity measure is to be performed.

4. Method according to claim 1, wherein both the initial and every additional voice profile obtained during a user's attempt to gain access is stored.

5. Method according to claim 4, wherein either continually or during a current attempt to gain access a current upper threshold of the similarity measure is determined from the stored voice profiles.

6. Method according to claim 4, wherein the current voice profile is compared with more than one of the stored voice profiles, from the results of this comparison a mean current similarity measure is determined, and a threshold discrimination is applied to the mean current similarity measure.

7. Method according to claim 1, wherein during the initialization and subsequent access attempts, speech samples provided by the user are stored, and a group of initial similarity evaluations is applied to the currently input speech sample, and thereafter or previously the comparison of the second similarity measure is applied to the voice profile derived from the currently input speech sample in comparison with the stored voice profile or one of them.

8. Method according to claim 1, wherein a user-guidance output instructs the user to input a first speech sample to which he was previously trained, as well as a second, not previously trained speech sample, and a combined similarity evaluation is applied to the first and second speech samples.

9. Method according to claim 1, wherein as similarity measure a measure, of a distance separating the current and a stored voice profile is calculated, such that this procedure can in particular include a likelihood consideration.

10. Arrangement for implementing a user access control to a data network and/or to information stored in a user database to protect stored user data from unauthorized access, comprising:
speech-sample input means for the input of speech samples,
speech-sample processing means for to obtaining a prepared speech sample,
speech-sample storage means for storing prepared speech samples,
voice-profile calculation means for obtaining a voice profile from an input speech sample,
voice-profile storage means for storing the voice profiles thus obtained,
a voice-profile comparator unit to compare various voice profiles,
an access-control unit connected on an input side with an output of the voice-profile comparator unit, to emit an access-control signal, such that a similarity-measure calculation unit associated with the voice-profile-comparator unit on its output side is connected to a first and a second threshold-value discriminator for discriminating a calculated similarity measure at a lower and an upper threshold value, such that an input speech sample is compared with a speech sample model to determine a first similarity measure, and the first similarity measure is compared with the upper threshold value in the first threshold value discriminator, and access is denied if the upper threshold value is exceeded, and if the upper threshold value is not exceeded, the voice-profile comparator unit compares the current voice profile with an initial voice profile that has been stored in an authorization database to obtain a second similarity measure, and the second similarity measure is compared in the second threshold value discriminator with the lower threshold value, the output of at least the second threshold-value discriminator is connected regarding the control signal to a control input of the access-control unit.

11. Arrangement according to claim 10, wherein at least one of the first or second threshold-value discriminator is designed to be dynamically adjustable.

12. Arrangement according to claim 10, wherein connected to the output of the speech-sample processing means is a speech-sample comparator unit, with which is associated a second similarity-measure calculation unit which on its output side is connected to the second threshold-value discriminator, wherein the similarity-measure calculation unit of the voice-profile comparator unit acts as the first similarity-measure calculation unit and on its output side is connected to the first threshold-value discriminator.

13. Arrangement according to claim 10, wherein a user-guidance output unit is provided to emit prespecified speech-sample input requirements, and the voice profile calculation means and the voice-profile comparator unit are designed with multiple channels or for sequential, independent processing of several currently input speech samples for the determination of several current similalrity measures, and wherein the similarity-measure calculation unit, which is likewise designed with multiple channels or operates sequentially, is associated at its output side with a similarity-measure comparator unit which compares several of the similarity measures in the individual channels or several sequentially calculated similarity measures with one another, and wherein the access-control signal is generated while taking into account the result of such comparisons.

* * * * *